US008411843B1

(12) United States Patent
Cyriac et al.

(10) Patent No.: US 8,411,843 B1
(45) Date of Patent: Apr. 2, 2013

(54) NEXT AGENT AVAILABLE NOTIFICATION

(75) Inventors: Shaiju Kurian Cyriac, Westminster, CO (US); Diana Messano D'Angelo, Broomfield, CO (US); Sreerupa Das, Arvada, CO (US); Bruce Wallace Hill, Broomfield, CO (US); William Curtis Leck, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1991 days.

(21) Appl. No.: 11/244,359

(22) Filed: Oct. 4, 2005

(51) Int. Cl.
*H04M 3/00* (2006.01)

(52) U.S. Cl. ......... 379/266.06; 379/266.02; 379/266.03; 379/266.04; 379/266.05

(58) Field of Classification Search . 379/266.01–266.06
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |

(Continued)

FOREIGN PATENT DOCUMENTS

| | | |
|---|---|---|
| EP | 0 501 189 A2 | 9/1992 |
| EP | 0 740 450 A2 | 10/1996 |

(Continued)

OTHER PUBLICATIONS

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

(Continued)

*Primary Examiner* — Yuwen Pan
*Assistant Examiner* — Ibraham Sharifzada
(74) *Attorney, Agent, or Firm* — Sheridan Ross P.C.

(57) ABSTRACT

The present invention, in one embodiment, is directed to an agent available notifier 250 that (a) receives a request from the first customer, but not from the second customer, to be notified when the first contact is eligible for servicing by a selected resource so that the first customer is free to perform a desired activity and (b) in response to the first customer's request, provides the first customer with a selected notification that the first contact is eligible for servicing, wherein the second customer is not provided with the selected notification when the second contact is eligible for servicing.

16 Claims, 4 Drawing Sheets

U.S. PATENT DOCUMENTS

| | | | |
|---|---|---|---|
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | |
| 5,740,238 A | 4/1998 | Flockhart et al. | |
| 5,742,675 A | 4/1998 | Kilander et al. | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,818,907 A | 10/1998 | Maloney et al. | |
| 5,825,869 A | 10/1998 | Brooks et al. | |
| 5,828,747 A | 10/1998 | Fisher et al. | |
| 5,838,968 A | 11/1998 | Culbert | |
| 5,839,117 A | 11/1998 | Cameron et al. | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A | 5/1999 | Tonisson | |
| 5,903,877 A | 5/1999 | Berkowitz et al. | |
| 5,905,793 A | 5/1999 | Flockhart et al. | |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,038,293 A | 3/2000 | McNerney et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,052,723 A | 4/2000 | Ginn | |
| 6,055,308 A | 4/2000 | Miloslavsky et al. | |
| 6,064,730 A | 5/2000 | Ginsberg | |
| 6,064,731 A | 5/2000 | Flockhart et al. | |
| 6,084,954 A | 7/2000 | Harless | |
| 6,088,441 A | 7/2000 | Flockhart et al. | |
| 6,115,462 A | 9/2000 | Servi et al. | |
| 6,141,328 A * | 10/2000 | Nabkel et al. | 370/259 |
| 6,151,571 A | 11/2000 | Pertrushin | |
| 6,154,769 A | 11/2000 | Cherkasova et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,192,122 B1 | 2/2001 | Flockhart et al. | |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick | |
| 6,259,969 B1 | 7/2001 | Tackett et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley | |
| 6,292,550 B1 | 9/2001 | Burritt | |
| 6,295,353 B1 | 9/2001 | Flockhart et al. | |
| 6,353,810 B1 | 3/2002 | Petrushin | |
| 6,356,632 B1 | 3/2002 | Foster et al. | |
| 6,366,668 B1 | 4/2002 | Borst et al. | |
| 6,389,028 B1 | 5/2002 | Bondarenko et al. | |
| 6,389,132 B1 | 5/2002 | Price | |
| 6,389,400 B1 | 5/2002 | Bushey et al. | |
| 6,424,709 B1 | 7/2002 | Doyle et al. | |
| 6,426,950 B1 | 7/2002 | Mistry | |
| 6,427,137 B2 | 7/2002 | Petrushin | |
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,535,600 B1 | 3/2003 | Fisher et al. | |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,597,685 B2 | 7/2003 | Miloslavsky et al. | |
| 6,614,903 B1 | 9/2003 | Flockhart et al. | |
| 6,650,748 B1 | 11/2003 | Edwards et al. | |
| 6,694,008 B1 * | 2/2004 | Mukherji et al. | 379/228 |
| 6,704,409 B1 | 3/2004 | Dilip et al. | |
| 6,707,903 B2 | 3/2004 | Burok et al. | |
| 6,714,643 B1 * | 3/2004 | Gargeya et al. | 379/266.06 |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 7,130,411 B2 * | 10/2006 | Brown et al. | 379/266.01 |
| 2001/0056349 A1 | 12/2001 | St. John | |
| 2002/0002460 A1 | 1/2002 | Pertrushin | |
| 2002/0002464 A1 | 1/2002 | Petrushin | |
| 2002/0010587 A1 | 1/2002 | Pertrushin | |
| 2002/0067823 A1 * | 6/2002 | Walker et al. | 379/266.01 |
| 2002/0118816 A1 | 8/2002 | Flockhart et al. | |
| 2002/0181692 A1 | 12/2002 | Flockhart et al. | |
| 2002/0194002 A1 | 12/2002 | Petrushin | |
| 2003/0103620 A1 * | 6/2003 | Brown et al. | 379/266.01 |

| | | | |
|---|---|---|---|
| 2003/0123642 | A1 | 7/2003 | Alvarado et al. |
| 2003/0138080 | A1* | 7/2003 | Nelson et al. .............. 379/88.16 |
| 2003/0152212 | A1 | 8/2003 | Burok et al. |
| 2003/0174830 | A1 | 9/2003 | Boyer et al. |
| 2003/0177017 | A1 | 9/2003 | Boyer et al. |
| 2003/0177231 | A1 | 9/2003 | Flockhart et al. |
| 2004/0203878 | A1 | 10/2004 | Thomson |
| 2005/0198107 | A1* | 9/2005 | Cuhls et al. ................... 709/201 |
| 2005/0260975 | A1* | 11/2005 | Chen et al. .................... 455/415 |
| 2007/0041557 | A1* | 2/2007 | Chatterjee et al. ....... 379/218.01 |

FOREIGN PATENT DOCUMENTS

| | | |
|---|---|---|
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | 2143198 | 1/1995 |
| WO | 2174762 | 6/1995 |
| WO | WO 96/07141 | 3/1996 |
| WO | WO 97/28635 | 8/1997 |
| WO | WO 98/56207 | 12/1998 |

OTHER PUBLICATIONS

Avaya, Inc., "Better Implementation of IP in Large Networks," Avaya, Inc. 2002, 14 pages.

Avaya, Inc., "Voice Over IP Via Virtual Private Networks: An Overview," Avaya, Inc., Feb. 2001, 9 pages.

Coles, Scott, "A Guide for Ensuring Service Quality in IP Voice Networks," Avaya, Inc., 2002, pp. 1-17.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

L.F. Lamel and J.L. Gauvain, Language Identification Using Phone-Based Acoustic Likelihood, ICASSP-94, date unknown; 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. p. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26, 2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

"Domain Name Services," available at http://www.pism.com/chapt09/chapt09.html, downloaded Mar. 31, 2003, 21 pages.

"Internet Protocol Addressing," available at http://samspade.org/d/ipdns.html, downloaded Mar. 31, 2003, 9 pages.

"Product Features," Guide to Call Center Automation, CRC Information Systems, Inc., Tel-ATHENA, Section 5—Company C520, p. 95, 1992.

U.S. Appl. No. 09/235,065, Denton et al.
U.S. Appl. No. 09/247,893, Edwards et al.
U.S. Appl. No. 09/264,497, Edwards.
U.S. Appl. No. 09/756,955, Flockhart et al.
U.S. Appl. No. 09/420,912, Ford.
U.S. Appl. No. 09/416,737, Flockhart et al.
U.S. Appl. No. 10/098,824, Flockhart et al.
U.S. Appl. No. 10/673,118, Flockhart et al.
U.S. Appl. No. 10/673,115, Flockhart et al.
U.S. Appl. No. 10/673,103, Flockhart et al.
U.S. Appl. No. 10/673,105, Flockhart et al.
U.S. Appl. No. 10/683,039, Flockhart et al.
U.S. Appl. No. 10/099,144, Boyer et al.
U.S. Appl. No. 10/815,534, Flockhart et al.
U.S. Appl. No. 10/815,566, Kiefhaber et al.
U.S. Appl. No. 10/815,584, Kiefhaber et al.
U.S. Appl. No. 10/861,193, Flockhart et al.
U.S. Appl. No. 10/891,346, Flockhart et al.
U.S. Appl. No. 10/946,638, Flockhart et al.
U.S. Appl. No. 10/000,686, Flockhart et al.

"Product Features," *Guide to Call Center Automation*, Brock Control Systems, Inc., Activity Managers Series™, Section 5—Company B120, p. 59, 1992.

Dawson, "NPRI's Powerguide, Software Overview" *Call Center Magazine* (Jun. 1993), p. 85.

"Applications, NPRI's Predictive Dialing Package," *Computer Technology* (Fall 1993), p. 86.

"Call Center Software You Can't Outgrow," *Telemarketing®*(Jul. 1993), p. 105.

"VAST™, Voicelink Application Software for Teleservicing®," *System Manager User's Guide*, Digital Systems (1994), pp. ii, vii-ix, 1-2, 2-41 through 2-77.

GEOTEL Communications Corporation Web site printout entitled "Intelligent CallRouter™, Optimizing the Interaction Between Customers and Answering Resources," 6 pages.

Avaya, Inc. Business Advocate Product Summary, at http://www.avaya.com, downloaded on Feb. 15, 2003, Avaya, Inc. 2003, 3 pages.

Avaya, Inc. Business Advocate Options, at http://www.avaya.com, downloaded on Feb. 15, 2003, Avaya, Inc. 2003.

Avaya, Inc. CentreVu Advocate, Release 9, User Guide, Dec. 2000.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Avaya, Inc., "The Advantages of Load Balancing in the Multi-Call Center Enterprise," Avaya, Inc., 2002, 14 pages.

Foster, Robin, et al., "Avaya Business Advocate and its Relationship to Multi-Site Load Balancing Applications," Avaya, Inc., Mar. 2002, 14 pages.

Chavez, David, et al., "Avaya MultiVantage Software: Adapting Proven Call Processing for the Transition to Converged IP Networks," Avaya, Inc., Aug. 2002.

Doo-Hyun Kim et al. "Collaborative Multimedia Middleware Architecture and Advanced Internet Call Center," Proceedings at the International Conference on Information Networking (Jan. 31, 2001), pp. 246-250.

"When Talk Isn't Cheap," *Sm@rt Reseller*, v. 3, n. 13 (Apr. 3, 2000), p. 50.

"eGain's Commerce 2000 Platform Sets New Standard for eCommerce Customer Communications," *Business Wire* (Nov. 15, 1999)., 3 pages.

* cited by examiner

NEXT AGENT AVAILABLE NOTIFICATION

FIELD OF THE INVENTION

The invention relates generally to contact centers and particularly to the servicing of customers by a contact center.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

A constant challenge in contact centers is maintaining customer satisfaction and therefore maintaining goodwill. For example, though more efficient contact routing algorithms are in use customers are frequently frustrated by unexpectedly long wait times in queue, and infrequent notifications, at best, of their queue positions or wait times until they are serviced. Customers therefore have no idea how long they will need to stay on the line until they are assigned to an agent for servicing. To make matters even worse, waiting customers are "held captive" by the contact center. They are prevented from receiving another call or attending to matters requiring both hands because of the fear of their call arriving at the head of the queue while they are absent, thereby causing them to lose not only their queue position but also the call itself. The agent will often hang up the phone based on the erroneous belief that the call is a prank. The customer would then need to redial the contact center and start all over again at the tail of the queue.

One attempt to address this problem it to provide for agent call back at the customer's request. The contact center places the call back request in a queue, and the contact center calls the customer back when the request reaches the head of the queue. The problem with this approach is that the customer has only "good faith" for a call back. Worse, the customer often doesn't know when he or she will be called back as he or she is given no information about his or her position in queue as a function of time. When the customer is on hold, he or she knows that the call will eventually be answered and, in some systems, may receive periodic notifications of his or her queue status. For example, some e-commerce centers provide relatively up-to-date wait-time information on a periodically refreshed Web page. Call back systems provide no such feed back.

SUMMARY OF THE INVENTION

These and other needs are addressed by the various embodiments and configurations of the present invention. The present invention is directed to various customer notifiers in contact center architectures.

In one embodiment of the present invention, a method for servicing customer contacts is provided that includes the steps of:
 (a) placing first and second contacts from first and second customers, respectively, in a queue to wait for servicing by a selected resource;
 (b) receiving a request from the first customer, but not from the second customer, to be notified when the first contact is eligible for servicing by the selected resource so that the first customer is free to perform a desired activity; and
 (c) in response to the first customer's request, providing the first customer with a notification that the first contact is eligible for servicing. The second customer is not notified when the second contact is eligible for servicing because the second customer did not request such an advanced notification.

In another embodiment, a method for servicing a customer contact includes the steps of:
 (a) while a customer contact is enqueued, determining that a customer has placed the contact on hold to answer an incoming call;
 (b) when the customer contact has reached a determined position in the queue, providing an audible notification to the customer; and
 (c) in response to step (b), determining whether the customer is active on the customer contact.

The above embodiments permit a customer to attend to other activities, even at a distance from his or her communication device. The activities include, for example, housework, answering an incoming call, attending to children's needs, going to the bathroom, all without losing the customer's place in queue. An agent available notification, for example, is played over the communication device's internal and/or external speaker and/or displayed on a Graphical User Interface or GUI to announce that an agent is ready or soon to be ready to service the contact. The customer is provided with enough time to respond before the contact center requeues or terminates the contact.

In yet another embodiment, a method for servicing customer contacts includes the steps of:
 (a) providing a common queue including first and second contacts corresponding to first and second customers, respectively; and
 (b) providing queue status updates to the first and second customers at different frequencies and/or containing different queue metrics.

This embodiment can offer queue status information to customers on demand and/or at customer-configured, defined intervals or frequency. The queue status information can include one or more selected or predetermined current metrics, such as the predicted and/or expected wait time until the customer is assigned to an agent for servicing, the predicted and/or expected wait time until the customer is at a designated queue position the advance rate of contacts in the queue, the current queue position of the customer's contact, current rate at which the queue is being serviced (e.g., "we are currently servicing two queue positions every three minutes."), and current state of requeuing (e.g., "You have been requeued "x" times for not responding to an agent. You will only be requeued "y" more times before being dropped from the queue."). The customer can request queue status information as frequently as the customer desires. This permits the customer to make an informed decision between dropping or terminating the contact in favor of other activities or waiting for servicing.

The various embodiments can provide individually and collectively a number of contact center benefits. For example, customer satisfaction levels can be increased substantially while contact abandonment rates can be dramatically decreased.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
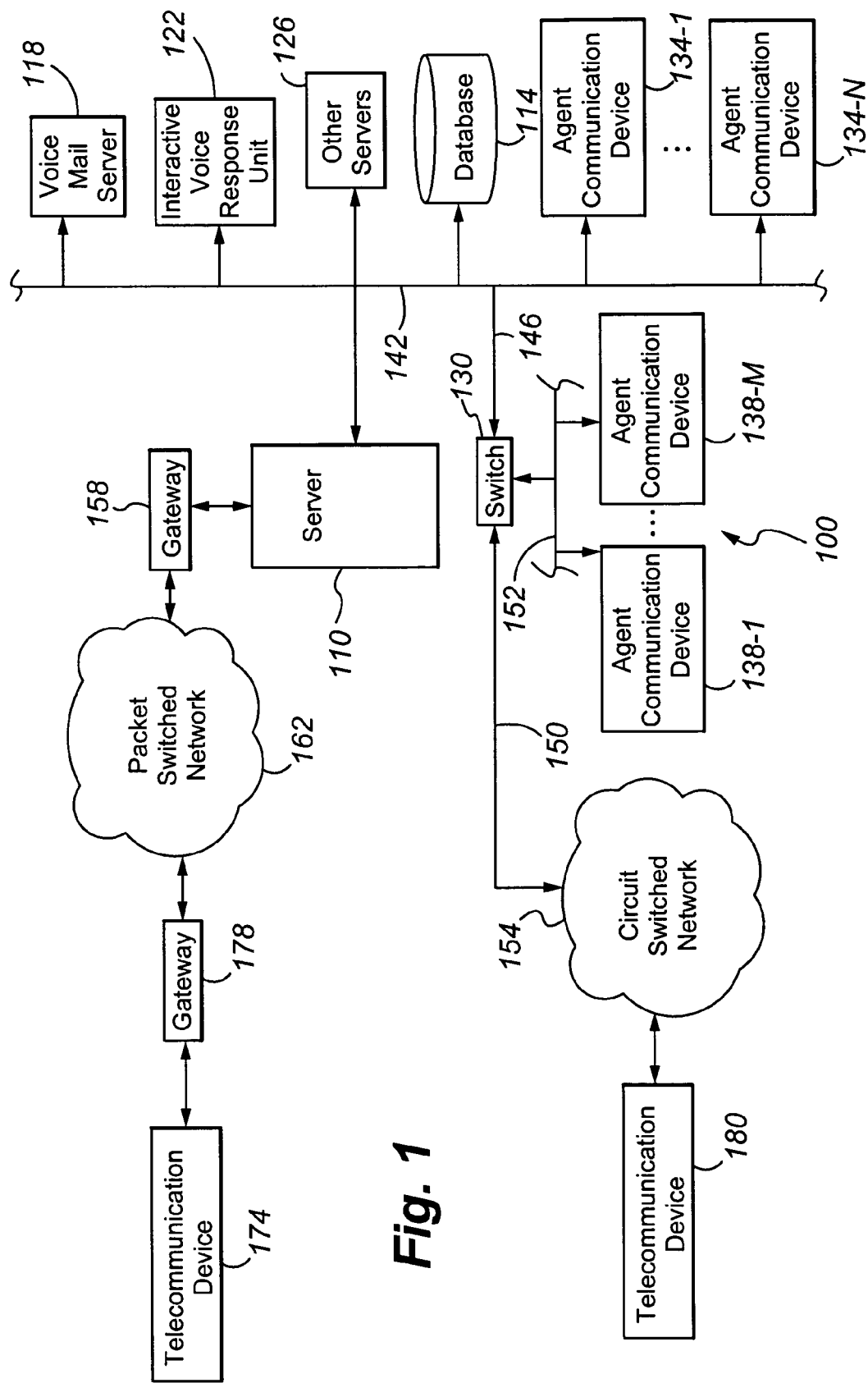
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Communication Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
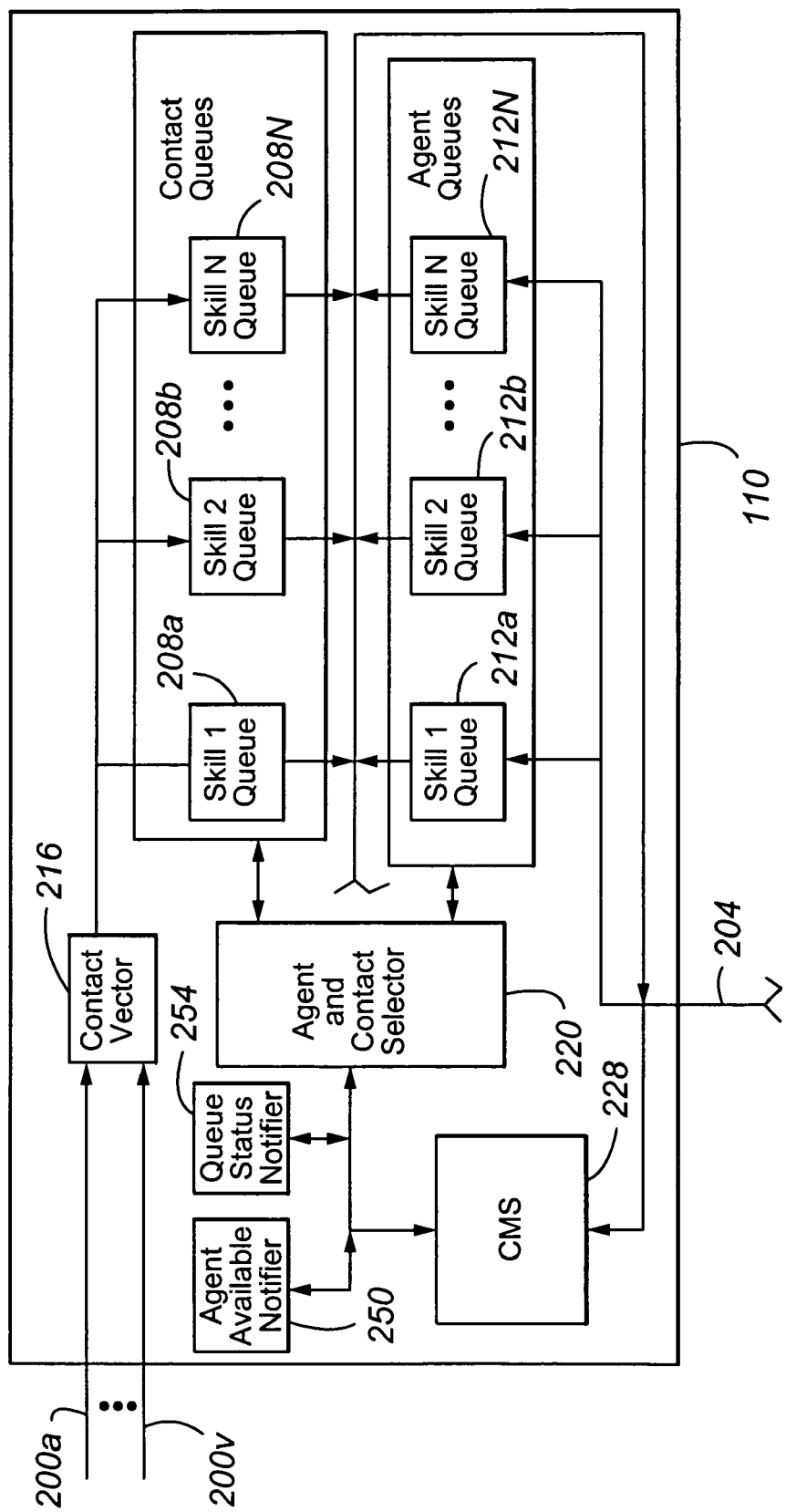
FIG. 2 is a block diagram of a server according to an embodiment of the present invention.

Referring to FIG. 2, one possible configuration of the server 110 is depicted. The server 110 is in communication with a plurality of customer communication lines $200a\text{-}y$ (which can be one or more trunks, phone lines, etc.) and agent communication line 204 (which can be a voice-and-data transmission line such as LAN 142 and/or a circuit switched voice line 152). The server 110 can include a Basic Call Management System™ or BCMS and a Call Management System™ or CMS 228 that gathers call records and contact-center statistics for use in generating contact-center reports. CMS and BCMS and any other reporting system, such as Operational Analyst™ will hereinafter be referred to jointly as CMS 228.

The switch 130 and/or server 110 can be any architecture for directing contacts to one or more communication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

Referring to FIG. 2, included among the data stored in the server 110 is a set of contact queues $208a\text{-}n$ and a separate set of agent queues $212a\text{-}n$. Each contact queue $208a\text{-}n$ corresponds to a different set of agent skills, as does each agent queue $212a\text{-}n$. Conventionally, contacts are prioritized and either are enqueued in individual ones of the contact queues $208a\text{-}n$ in their order of priority or are enqueued in different ones of a plurality of contact queues that correspond to a different priority. Likewise, each agent's skills are prioritized according to his or her level of expertise in that skill, and either agents are enqueued in individual ones of agent queues $212a\text{-}n$ in their order of expertise level or are enqueued in different ones of a plurality of agent queues $212a\text{-}n$ that correspond to a skill and each one of which corresponds to a different expertise level. Included among the control programs in the server 110 is a contact vector 216. Contacts incoming to the contact center are assigned by contact vector 216 to different contact queues $208a\text{-}n$ based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be any suitable gateway, such as Avaya Inc.'s, G700 Media Gateway™, and may be implemented as hardware such as via an adjunct processor (as shown) or as a chip in the server.

The first communication devices 134-1, . . . 134-N are packet-switched while the second communication devices 138-1, . . . 138-M are circuit-switched. The packet-switched communication devices can use a variety of interactive real time communication applications, such as Voice over IP or VoIP, instant messaging, chat, text messaging, and the like. The packet-switched devices typically include wired and wireless IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts. The second communication devices can be any live voice communication devices and generally include Time Division Multiplexed (TDM) wired and wireless telephones, PDAs, H.320 video phones and conferencing units, voice messaging and response units, and traditional computer telephony adjuncts.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" or "customer communication devices" and are not directly supported as communication device endpoints by the switch or server. The communication devices 174 and 180 are thus external endpoints as opposed to the agent communication devices which are internal endpoints.

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the component to forward or route the contact to a specific contact center resource, such as the IVR unit 122, the voice mail server 118, and/or first or second communication device 134, 138 associated with a selected agent. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

According to the invention, agent available and queue status notifier modules 250 and 254 are provided. The modules are stored either in the main memory or in a peripheral memory (e.g., disk, CD ROM, etc.) or some other computer-readable medium of the center 100.

The agent available notifier 250, when activated by a customer/contactor, notifies the activating customer when the customer's contact is at the head or near the head of a queue 208 so that the customer is not required to remain continuously on the communication device 174, 180 while his or her contact advances in the queue 208. By way of example, if the customer is active on a first call with the contact center waiting for servicing and receives an incoming (second) call announced by a "call waiting" tone(s) the customer can hit a selected key, such as the [flash] key, to place the first call with the contact center on hold and toggle over to and connect to the incoming second call. The first call with the contact center is "on hold" and continues to advance towards the head of the queue while the customer is active on the second call. When the first call advances to the head of the queue or another selected queue position and/or immediately before or when the first call is delivered to an agent for servicing, the notification is provided as one or more audible tones generated by the tone generators in the server 110 and transmitted over the customer communication line 200. The tone(s) are received by the device 174, 180 and played audibly over a speaker of the device. In other words, the customer hears not only the conversation in the second call but also the audible tones. The customer again hits the [flash] key after terminating the second call or to place the second call on hold while he or she converses with the agent assigned to service the first call. In another example, while the customer is active on the contact with the contact center and waiting for servicing by an agent the customer decides that he or she must put the communication device down to attend to an urgent personal matter, such as tending to a child, answering a door, removing food from an oven, going to the bathroom, etc. The customer activates the agent available notifier 250 and an external speaker, such as the external speaker on a speaker phone (i.e., the speaker external to the handset), and attends to the personal matter. When the contact advances to the head of the queue or another selected queue position and/or immediately before or when the first contact is delivered to an agent for servicing, the notification is provided as one or more audible tones generated by the tone generators in the server 110 and transmitted over the customer communication line 200. The tone(s) are received by the device 174, 180 and played audibly over the external speaker of the device so that the customer can hear the tones while he or she is located at a distance from the handset. When the customer hears the tones, the customer picks up the handset and converses with the servicing agent. In either example, the customer is able to attend to alternate activities without losing his or her place in the customer queue 208.

The queue status notifier 254, when activated by the customer, obtains and notifies the customer of current queue metrics for the queue position assigned to the customer's enqueued contact. The metrics can include any customer or agent queue-related information, such as the number of agents in the servicing agent queue 212, the predicted and/or expected wait time until the customer is assigned to an agent for servicing, the predicted and/or expected wait time until the customer is at a designated queue position such as the head of the queue (e.g., "your expected wait time is 25 minutes"), the advance rate of contacts in the corresponding customer queue 208 (e.g., "the average time per call is 5 minutes"), the current queue position of the customer's contact (e.g., "you are currently the $25^{th}$ person in line"), current rate at which the queue is being serviced (e.g., "we are currently servicing two queue positions every three minutes."), and current state of requeuing (e.g., "You have been requeued "x" times for not responding to an agent. You will only be requeued "y" more times before being dropped from the queue."). For example, a customer dials into a contact center and is told that he or she is the $25^{th}$ person in line. The customer waits on hold 10 minutes and has still not been serviced. The customer has no idea of where he or she is in line (or his or her queue position). The customer presses a selected key, such as the [#] key, to receive, from the notifier 254, on-demand status as to the customer's current (e.g., within a predetermined time of the key press) queue position and expected wait time. Alternatively, the customer's queue status could thereafter be announced every time it changes, either audibly or via the text capability of the communication device.

Figure 3:
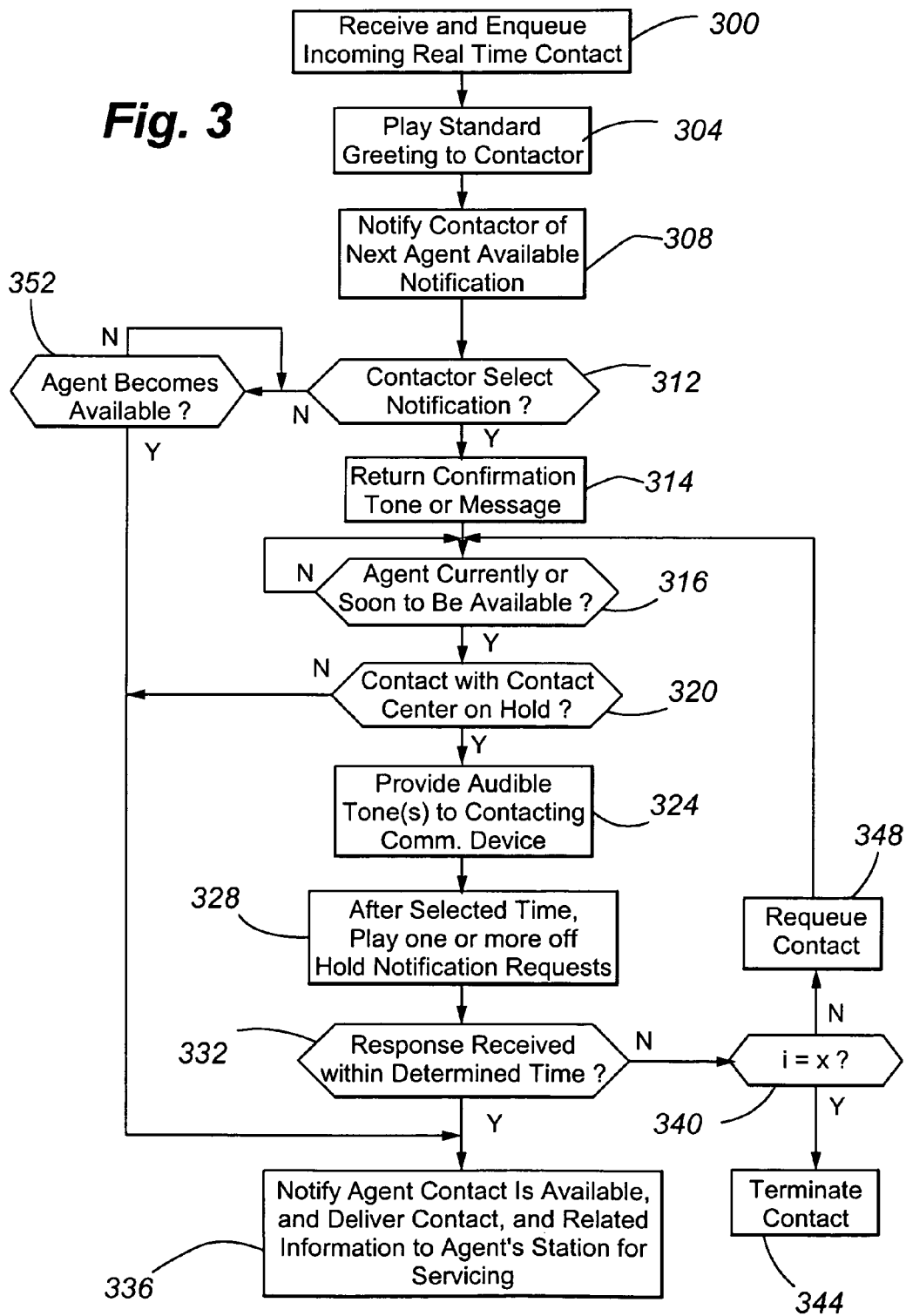
FIG. 3 is a flow chart showing an operational embodiment of an agent available notifier according to the present invention.

The operation of the agent available notifier 250 will now be discussed with reference to FIGS. 2 and 3. As shown in FIG. 3, the contact center, in step 300, receives and enqueues (in a contact queue 208) an interactive real time or near real time contact from a customer. The interactive contact can be, for example, a voice call, an instant message session, a chat session, and the like. In step 304, the contact center plays and/or displays a standard greeting to the customer, such as "you are the $25^{th}$ caller" and/or "your approximate wait time is 55 minutes". In step 308, the customer is notified by the contact center of the next agent available notification option. The notification option can be audible or graphically displayed and can be the following message:

You can be informed when an agent is available by dialing [*2]. This will permit you to do other activities while waiting for assistance. A text message will be heard when your agent is available. Or you may flash your phone to pick up another call. You will receive a confirmation tone when the agent is available.

In decision diamond 312, the contact center determines whether the customer selected the notification feature (or entered the next agent available notification mode) by transmitting a selected set of signals to the contact center. In one configuration, the set of signals is transmitted when the customer has pressed a selected key, which in the example message is [*2]. The key may be transmitted to the contact center from the customer communication device as a DTMF signal. Alternatively, another type of audible or text message may be transmitted. If the customer has not selected the notification mode, the notifier in decision diamond 352 determines whether an agent is available to service the contact. Decision diamond 352 is repeated at selected intervals until an agent is available. If the customer has selected the notification mode, the contact center, in step 314, returns a confirmation tone or message advising that the customer has entered the next agent available notification mode (or activated the next agent available notification feature).

In next decision diamond 316, the notifier 250 determines whether a selected agent is currently available and/or will be available within a selected period of time. When an agent is not currently available and/or will not be available within a selected period of time, the notifier 250 returns to and repeats decision diamond 316 at a selected time interval.

When an agent is currently available and/or will be available within a selected period of time, the notifier 250 proceeds to decision diamond 320 and determines whether the contact with the customer has been placed "on hold" by the customer. This can be determined, for instance, when DTMF signals are received corresponding to the [flash] key. The customer does this when the customer toggles to an incoming call using the call waiting feature of his or her communication device. In an instant message or chat session, the customer may send a text message indicating that he or she has minimized the window corresponding to the session.

When the contact has been placed "on hold", the notifier, in step 324, provides the customer's communication device with one or more audible tones and/or graphical messages, which are in turn played over the speaker and/or displayed on a screen of the device to be heard or viewed by the customer. As noted, the tones are played over the other customer's listening channel in the contact between the communication device and the communication device of a third party. In one configuration, the audible tones are the same as the "call waiting" interrupt tones. At this juncture, a call classifier or other signal monitor, which has been assigned to the contact, determines whether and what type of audible and/or text signals are returned by the customer. In optional step 328, after the passage of a selected time (without detection of a voice signal from the customer) the notifier plays one or more notification requests (such as "We have an agent ready to serve you. Please provide a voice response so that we may proceed to connect you") over the customer's listening channel of the contact between the contact center and communication device but not over the customer's listening channel between the communication device and the third party communication device.

In decision diamond 332, the notifier determines, from the assigned signal monitor, whether a voice and/or text response has been received from the customer within a predetermined time measured either from the transmission of the audible tone(s)/message(s) or customer notification requests. If no response has been received within a determined time, the notifier increments a queue counter i (which has been initialized to a value of "zero" the first time through the flow chart) by "one" and, in decision diamond 340, determines whether the value of the counter is equal to a selected value x. X is the maximum number of requeues permitted for a customer. If so, the contact with the customer is terminated in step 344. If not, the contact is requeued, or again placed at the tail of the customer queue 208, in step 348. The activation of the next agent available notification mode is not changed for the contact as it again moves through the queue. The notifier then returns to decision diamond 316.

If a response is received within a determined time, if the agent becomes available in decision diamond 352, or if the contact with the contact center is not on hold in decision diamond 320, the notifier proceeds to step 336. In step 336, the contact center notifies the agent that a contact is available for servicing and delivers the contact and related information to the agent's communication device for servicing. As will be appreciated, the customer related information can include customer identity, customer business history, customer information collected by the IVR 122, and the like.

In an alternative embodiment, the contact is delivered to the agent after step 324, and step 328 and decision diamond 332 are omitted. When the contact is delivered, the agent is notified that the customer may be "on hold". The agent determines whether the customer has activated (or removed from hold) the contact with the contact center. The agent typically does this by announcing his or her presence on the line and waiting for a selected time for a response. If no response is received within the selected time, the agent assumes that the customer is still "on hold" and has decided not to respond to the audible tones or message played over the customer communication device. If the customer is still on hold, the agent can request, such as by pressing the [*3] keys, that the customer's contact be requeued. In response, decision diamond 340 and steps 348 or 344 (as appropriate) are performed. In either this alternative or the prior embodiment, when the customer is requeued an announcement would be provided notifying the customer that he or she has been requeued because the call was ready for servicing by an agent and he or she failed to respond to the agent available message or audible tone, as the case may be.

Figure 4:
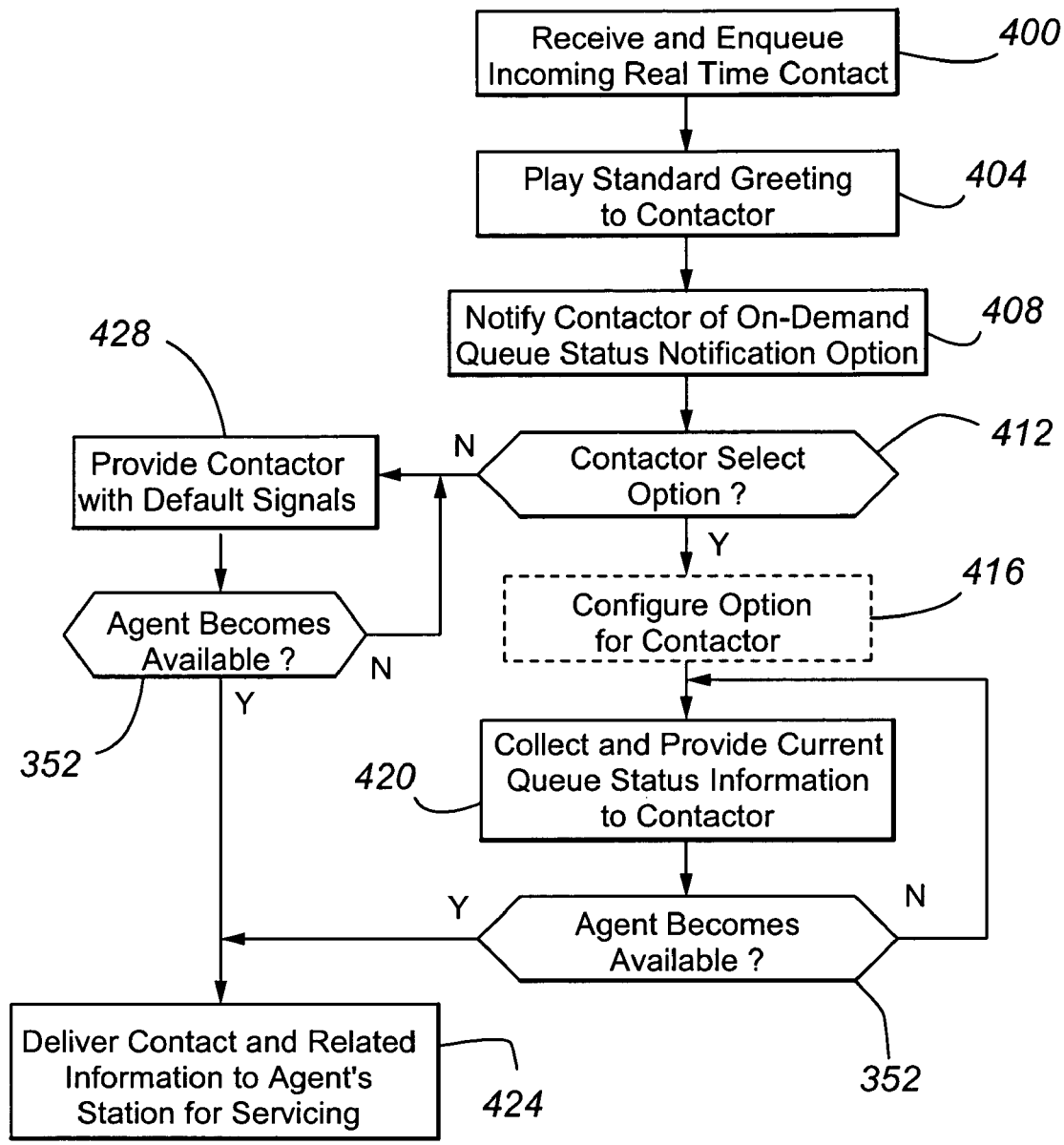
FIG. 4 is a flow chart showing an operational embodiment of a queue status notifier according to the present invention.

The operation of the queue status notifier 254 will now be discussed with reference to FIGS. 2 and 4. As shown in FIG. 4, the customer contact is received and enqueued in a customer queue 208 in step 400. The standard greeting is played by the contact center in step 404. In step 408, the contact center notifies the contactor of the on-demand queue status notification option or mode. This may be done, for example, using the following message:

You can be informed of your current queue status by dialing [*4]. In response, the contact center will provide you with your current queue position, queue advance time, and expected wait time for servicing by an agent.

In decision diamond 412, the contact center determines whether the contactor has selected the on-demand queue status notification option. If so, the notifier 254 in optional step 416 interacts with the customer to determine his or her configuration options for the notification. The customer, for example, may select a recurring frequency for automatic on-demand notifications and the status information to be provided in the notifications (e.g., select one or more of the predicted and/or expected wait time until the customer is assigned to an agent for servicing, the predicted and/or expected wait time until the customer is at a designated queue position such as the head of the queue, the advance rate of contacts in the corresponding customer queue 208, the current queue position of the customer's contact, current rate at which the queue is being serviced (e.g., "we are currently servicing two queue positions every three minutes."), and current state of requeuing (e.g., "You have been requeued "x" times for not responding to an agent. You will only be requeued "y" more times before being dropped from the queue."). The customer may select a fixed or variable frequency for queue status notifications to be provided. By way of illustration, a fixed frequency could be once every 10 minutes and a variable frequency could be every time the customer's queue position changes. This ability can permit different customers in the same customer queue 208 to receive queue update notifications at differing frequencies and/or containing different queue status information.

In step 420, the notifier 254 collects and provides the current queue status information to the customer. This can be done by audible and/or text messages.

In decision diamond 352, the contact center determines whether or not the agent has become available. If not, the notifier returns to and repeats step 420 at a selected time interval and/or when the customer next requests an on-demand queue status notification.

Returning again to decision diamond 412 when the contactor does not select the on-demand queue notification option, the contact center in step 428 provides the customer with the default signals, such as a one-time queue status information notification, music, advertisement messages, and the like. In decision diamond 352, the contact center determines whether an agent has become available. If not, the contact center returns to and repeats step 428 or decision diamond 352 as appropriate.

In decision diamond 352, when the agent becomes available, the contact center, in step 424, delivers the contact and related customer information to the agent's communication device for servicing.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing customer contacts, comprising:
    (a) placing first and second contacts from first and second customers, respectively in a queue to wait for servicing by a selected resource;
    (b) receiving a request from the first customer, but not from the second customer, to be notified when the first contact is eligible for servicing by the selected resource so that the first customer is free to perform a desired activity;
    (c) maintaining a connection between the first customer and a contact center while the first contact advances in the queue and while the first customer is allowed to perform the desired activity; and
    (d) in response to the first customer's request, providing the first customer with an advanced notification that the first contact is eligible for servicing, wherein the advanced notification is provided via the connection, and wherein the second customer is not provided with the advanced notification when the second contact is eligible for servicing.

2. The method of claim 1, wherein the notification is at least one of an audible tone and a message and further comprising:
    (e) determining that the first customer places the first contact on hold to receive an incoming contact; and
    (f) after step (d), determining whether the first customer is active on the first contact.

3. The method of claim 2, wherein, when the first customer is not active on the first contact within a selected period of time after the notification is provided to the first customer, assigning the first contact a queue position different from the currently assigned queue position.

4. The method of claim 3, wherein the notification is played over the first customer's listening channel on the incoming contact.

5. The method of claim 1, wherein the resource is a human agent and wherein step (d) is performed before first contact is delivered to the agent for servicing.

6. The method of claim 1, further comprising:
    (e) receiving from the second customer an on-demand queue status request;
    (f) in response to the on-demand queue status request, determining a queue metric associated with the second contact; and
    (g) providing the queue metric to the second customer's communication device.

7. A method for servicing a customer contact, comprising:
    (a) while the customer contact is enqueued, determining that a customer has placed the customer contact on hold to answer an incoming call;
    (b) when the customer contact has reached a determined position in the queue, providing an audible notification to the customer via a connection established between the customer and a contact center associated with the queue even though the customer has placed the customer contact on hold; and
    (c) in response to step (b), determining whether the customer is active on the customer contact.

8. The method of claim 7, wherein audible notification is at least one of an audible tone and an audible message and wherein the audible notification is played on a listening channel of the customer on the incoming call.

9. The method of claim 7, wherein step (c) comprises a call classifier monitoring the customer contact channel for a voice response from the customer.

10. The method of claim 7, further comprising:
    when the customer is not active on the customer contact within a selected period of time after the notification is provided to the customer, assigning the customer contact a queue position different from the currently assigned queue position.

11. A contact center in which first and second contacts from first and second customers are in a common queue, comprising:
    an agent available notifier operable to (a) receive a request from the first customer, but not from the second customer, to be notified when the first contact is eligible for servicing by a selected resource so that the first customer is free to perform a desired activity and (b) in response to the first customer's request, maintain a connection with a communication device associated with the first customer while the first contact advances in the queue and while the first customer is allowed to perform the desired activity and provide the first customer with a selected notification via the connection that the first contact is eligible for servicing, wherein the second customer is not provided with the selected notification when the second contact is eligible for servicing.

12. The contact center of claim 11, wherein the selected notification is at least one of an audible tone and a message and wherein the agent available notifier is further operable to:
    (c) determine that the first customer places the first contact on hold to receive an incoming contact; and
    (d) after step (c), determine whether the first customer is active on the first contact.

13. The contact center of claim 12, wherein, when the first customer is not active on the first contact within a selected period of time after the notification is provided to the first customer, the contact center assigns the first contact a queue position different from the currently assigned queue position.

14. The contact center of claim 13, wherein the notification is played over the first customer's listening channel on the incoming contact.

15. The contact center of claim 11, wherein the resource is a human agent and wherein the notifier performs operation (b) before first contact is delivered to the agent for servicing.

16. The contact center of claim 11, further comprising:
    a queue status notifier operable to receive from the second customer an on-demand queue status request; in response to the on-demand queue status request, determine a queue metric associated with the second contact; and provide the queue metric to the second customer's communication device.

* * * * *